(12) United States Patent
DeWall (10) Patent No.: US 9,649,669 B1
(45) Date of Patent: May 16, 2017

(54) APPARATUS FOR CLEANING DRYWALL TOOLS

(71) Applicant: Harold O. DeWall, Escondido, CA (US)

(72) Inventor: Harold O. DeWall, Escondido, CA (US)

( * ) Notice: Subject to any disclaimer, the term of this patent is extended or adjusted under 35 U.S.C. 154(b) by 0 days.

(21) Appl. No.: 15/265,895

(22) Filed: Sep. 15, 2016

(51) Int. Cl.
| B08B 3/02 | (2006.01) |
| B08B 3/14 | (2006.01) |
| B08B 3/00 | (2006.01) |
| C02F 1/52 | (2006.01) |

(52) U.S. Cl.
CPC ............. *B08B 3/026* (2013.01); *B08B 3/006* (2013.01); *B08B 3/14* (2013.01); *C02F 1/5281* (2013.01)

(58) Field of Classification Search
CPC ......... B08B 3/026; B08B 3/028; B08B 3/006; B08B 3/14; B08B 3/0048
See application file for complete search history.

(56) References Cited

U.S. PATENT DOCUMENTS

| 2,987,259 | A | * | 6/1961 | Lindquist | ................ B08B 3/026 122/250 R |
| 3,072,040 | A | * | 1/1963 | Triplett | ................... B08B 3/006 134/102.1 |
| 4,056,114 | A | | 11/1977 | Boutillette | |
| 4,462,415 | A | * | 7/1984 | Otzen | ..................... B08B 3/006 134/111 |
| 5,004,536 | A | * | 4/1991 | Geisler | ............. B01D 21/2444 137/512 |
| 5,265,633 | A | * | 11/1993 | Knowlton | ............... B08B 3/006 134/135 |
| 5,485,860 | A | | 1/1996 | Robb et al. | |
| 5,549,128 | A | | 8/1996 | Mansur | |
| 5,878,925 | A | | 3/1999 | Denkins et al. | |
| 6,295,794 | B1 | | 10/2001 | Nordt et al. | |
| D665,955 | S | | 8/2012 | DeWall | |
| 2002/0152568 | A1 | | 10/2002 | Dillinger | |
| 2004/0084373 | A1 | | 5/2004 | Wilson | |
| 2007/0034233 | A1 | | 2/2007 | Ham et al. | |
| 2007/0182182 | A1 | | 8/2007 | Hail | |
| 2008/0210260 | A1 | | 9/2008 | Porter et al. | |

* cited by examiner

*Primary Examiner* — David Cormier
(74) *Attorney, Agent, or Firm* — Loyal McKinley Hanson (57) ABSTRACT

An apparatus for cleaning drywall tools includes a structure supporting two tanks, one above the other. The lower tank holds a supply of rinse water that includes a water-clarifying agent. A water-pumping assembly pumps the rinse water from the lower tank for pressurized tool-rinsing above the upper tank, with the upper tank collecting the used rinse water. After mud has settled from the used rinse water, thereby resulting in a body of clarified rinse water disposed above the settled mud, an upper water-draining assembly on the upper tank drains the clarified rinse water back to the lower tank for reuse or removal. A user lowers an adjustable inlet on the upper water-draining assembly to a position within the body of clarified rinse water so that only the clarified rinse water drains, without the settled mud. The apparatus is preferably work-bench size in order to enable contemporaneous tool cleaning by two users.

10 Claims, 9 Drawing Sheets

APPARATUS FOR CLEANING DRYWALL TOOLS

BACKGROUND OF THE INVENTION

1. Technical Field

This invention relates generally to the field of building construction. It relates more particularly to drywall, drywall installation equipment, and an apparatus for cleaning tools and other objects, including the tools used for drywall installation.

2. Description of Related Art

The term "drywall" herein includes panels made of a paper liner wrapped around an inner core of gypsum plaster, or the like. Such panels are also referred to as gypsum board, plasterboard, and sheetrock. Installation involves the use of various tools (i.e., "drywall tools") to prepare and apply drywall joint compound (i.e., a fluid slurry often referred to as "mud") in the process of taping joints between drywall panels and otherwise installing the drywall. The mud may, for example, include such constituents as water, limestone, expanded pearlite, ethylene-vinyl acetate polymer, and attapulgite that are blended in a delicate mixture having a creamy texture that facilitates application.

After applying the mud, a drywall installer (i.e., a "drywaller") cleans the drywall tools in order to remove accumulated mud. Existing tool-cleaning techniques often proceed by simply spraying the tools with water from a hose. The water rinses the mud from the tools, thereby producing dirty water (i.e., turbid water that is cloudy due to the presence of fine particles of mud constituents suspended in the water). To comply with various laws and regulations that forbid the introduction of contaminants into the water drainage system, the drywaller often cleans drywall tools by spraying them with a hose over a barrel. The barrel catches the dirty water so that the drywaller can disposed of the dirty water in an allowable manner at a later time.

Just exactly how a drywall installer should dispose of the dirty water remains a problem, however. One way, is to use the portable apparatus called a "Drywall Tool Cleaning and Recycling Apparatus" that is available under the trademark MUDMASTER WASHMASTER from Mudmaster, Inc. of Escondido, Calif. One model of such an apparatus (i.e., a "Washmaster") is shown in U.S. Pat. No. D665,955. In order to clean drywall tools, the drywaller sprays the drywall tools over a container portion of the Washmaster and then treats the dirty water with a water-clarifying agent and, preferably, an anti-foaming agent in order to quickly produce settled-out mud (i.e., mud constituents and/or other constituents previously in suspension) and clarified water. The drywaller wheels the Washmaster right to the drywall work area where it facilitates tool cleaning, dirty water collection, water clarification with the water-clarifying agent and anti-foaming agent, removal of the resulting clarified water, and recycling of the settled-out mud and/or other settled-out constituents.

Although a tool-cleaning apparatus such as the Washmaster is effective in many respects, the drywaller's use of "hot mud" instead of the more traditional premixed drywall mud complicates the tool-cleaning process. The term "hot mud" refers to quick-setting drywall mud that comes in a powdered form (usually in a plastic-lined paper bag to keep moisture out). It sets by an exothermic (heat-releasing) chemical reaction. Once water comes in contact with the powder, the combination of powder and water forms hot mud and begins a chemical reaction that causes the hot mud to harden. Manufacturers typically mix different amounts of hardening agents into the quick-setting drywall powder to cause it to set up (i.e., harden) in a desired time (e.g., 5-minutes, 20-minutes, 45-minutes, 90-minutes, or greater, as the drywaller may desire). Once the hot mud is hard, it will not shrink up or spread as it continues to dry, and so the drywaller acts quickly once the hot mud is mixed in order to apply it and then clean the drywall tools.

Thus, hot mud hardens in water. As a result, existing tool-cleaning techniques with existing tool-rinsing equipment that work for the more traditional premixed drywall mud are ineffective. The hot mud can become lodged in containers, pumps, and plumbing and cause severe damage.

SUMMARY OF THE INVENTION

In view of the foregoing, it is a primary objective of the present invention to alleviate the concerns outlined above. The present invention achieves this objective predicated on the inventor's recognition of those concerns, followed by the conception of a portable workbench-size apparatus for rinsing hot mud from drywall tools without incurring hot-mud damage to equipment. The apparatus includes a large, upwardly opening, lower tank (i.e., a rinse water storage tank) for holding a supply of "rinse water" (e.g., 50 gallons of water that includes a water-clarifying agent). Tool-rinsing proceeds by spraying tools over a large, upwardly opening, upper tank (i.e., a used rinse water collection tank), using rinse water delivered under pressure from the lower tank.

As tool-rinsing proceeds, the upper tank collects the "used rinse water" (i.e., rinse water in which is suspended the hot mud it has rinsed from the tools). After the hot mud has settled from the used rinse water to the upwardly facing bottom surface of the upper tank under action of the water-clarifying agent, thereby leaving a body of "clarified rinse water" disposed above the "settled mud," the user drains the clarified rinse water from the upper tank to the lower tank for reuse or removal. To do so, the user lowers an inlet on an upper water-draining assembly so that it is within the body of clarified rinse water, but above the settled mud. As a result of that upper water-draining technique, only the clarified rinse water is drained from the upper tank to the lower tank, without the settled mud being drained. The user then removes the settled mud from the upwardly facing bottom surface of the upper tank.

Thus, the apparatus of the present invention includes a support structure, a lower tank, an upper tank, a water-pumping assembly, and an upper water-draining assembly that work together in rinsing tools while avoiding hot-mud damage to equipment. The following detailed description and accompanying illustrative drawings make the foregoing and other objectives, features, and advantages of the invention more apparent.

DESCRIPTION OF THE PREFERRED EMBODIMENTS

Figure 1:
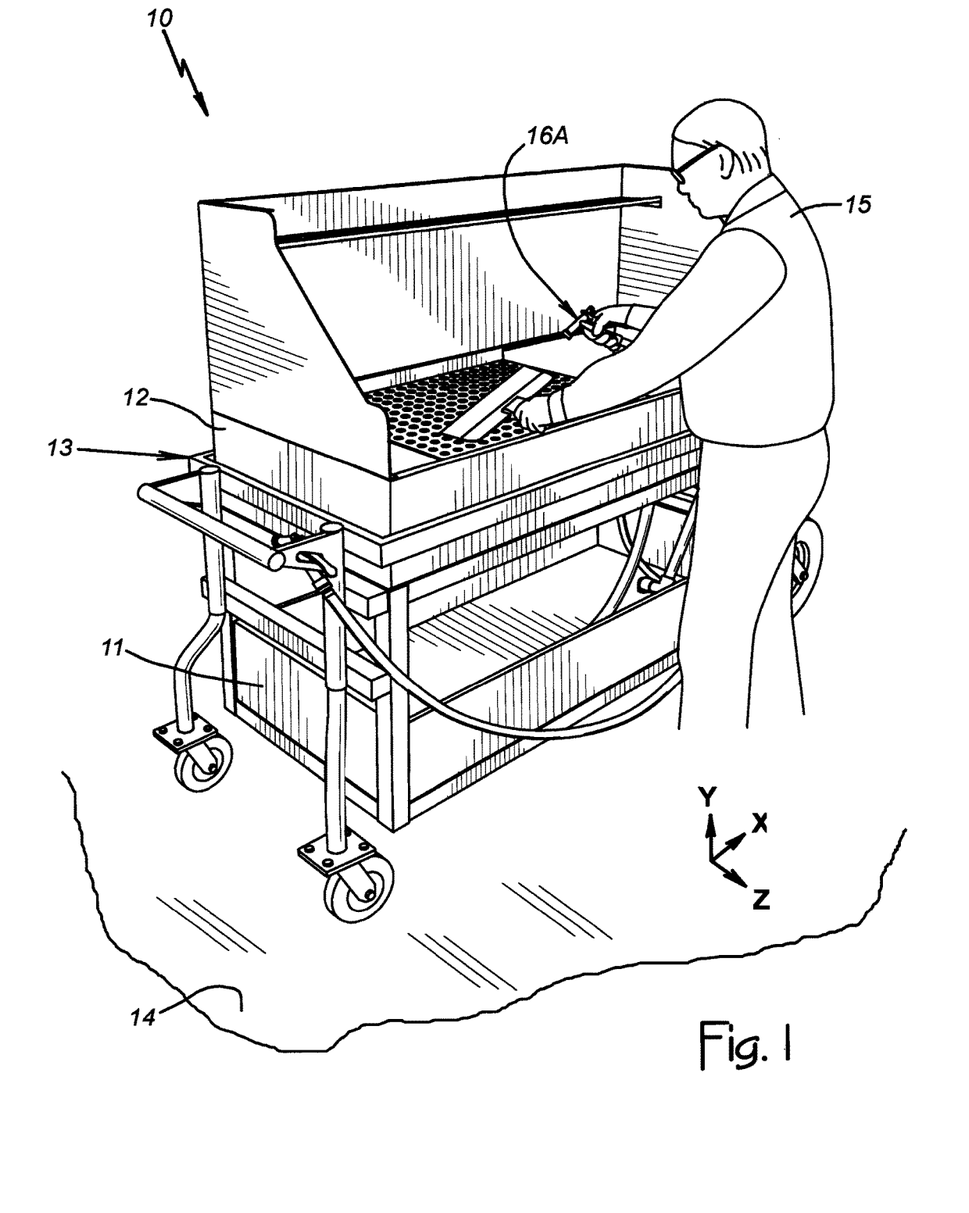
FIG. 1 of the drawings is a perspective view showing the top, the front, and the left side of an apparatus constructed according to the present invention, shown with a drywaller (i.e., a user) who is using the apparatus to clean his tools and with an XYZ Cartesian coordinate system for reference in describing various spatial relationships.

Turning first to FIG. 1 of the drawings, it shows a workbench size tool-cleaning apparatus 10 constructed according to the present invention. As such, the apparatus 10 includes a first or lower tank 11 (i.e., a rinse-water-holding tank) and a second or upper tank 12 (i.e., a used-rinse-water-collecting tank) that are supported, one tank above the other, by a support structure 13. Supported that way, with the support structure 13 resting as illustrated in an operative position upon a horizontal support surface 14 (i.e., a surface parallel to the XZ-plane of the illustrated XYZ Cartesian coordinate system), the apparatus 10 provides a convenient tool-cleaning work station at which a drywaller 15 can conveniently stand as he cleans (i.e., rinses) his drywall tools (something like rinsing dishes with a nozzle while standing at the kitchen sink).

Working in a standing position next to the apparatus 10, the drywaller 15 sprays his tools with rinse water delivered under pressure from the lower tank 11 via a first hose-and-nozzle combination 16A. A supply of rinse water has been omitted from the lower tank 11 in FIG. 1 for illustrative purposes, although use of the apparatus 10 would normally begin with about 50 gallons of rinse water in the lower tank 11, with the rinse water including a water-clarifying agent described later on in this specification. As the drywaller rinses his tools over the upper tank 12, the upper tank 12 collects the used rinse water for clarification and eventual drainage of clarified rinse water back to the lower tank 11.

Figure 2:
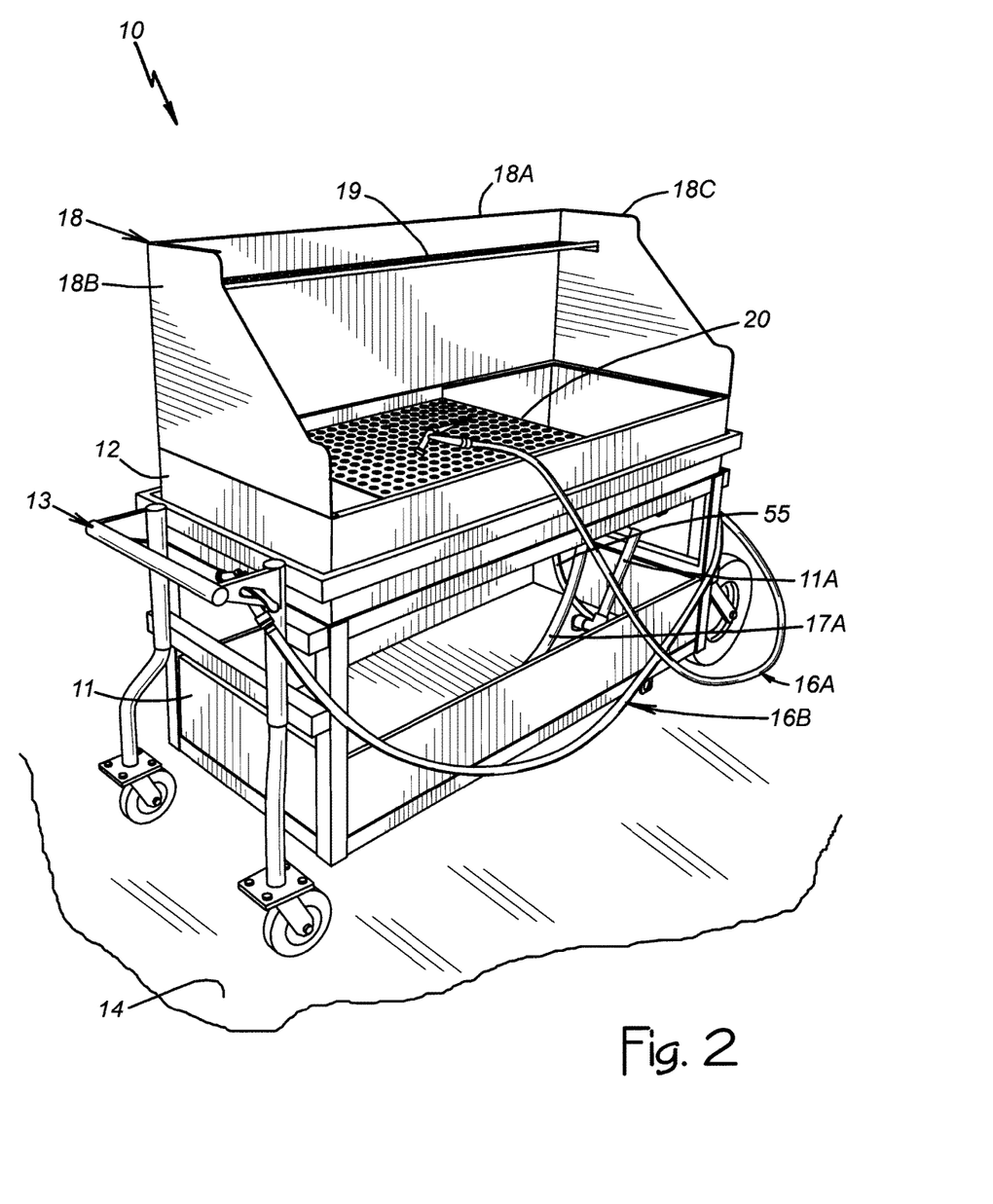
FIG. 2 of the drawings is a perspective view of the apparatus with the drywaller and his tools omitted.
Figure 3:
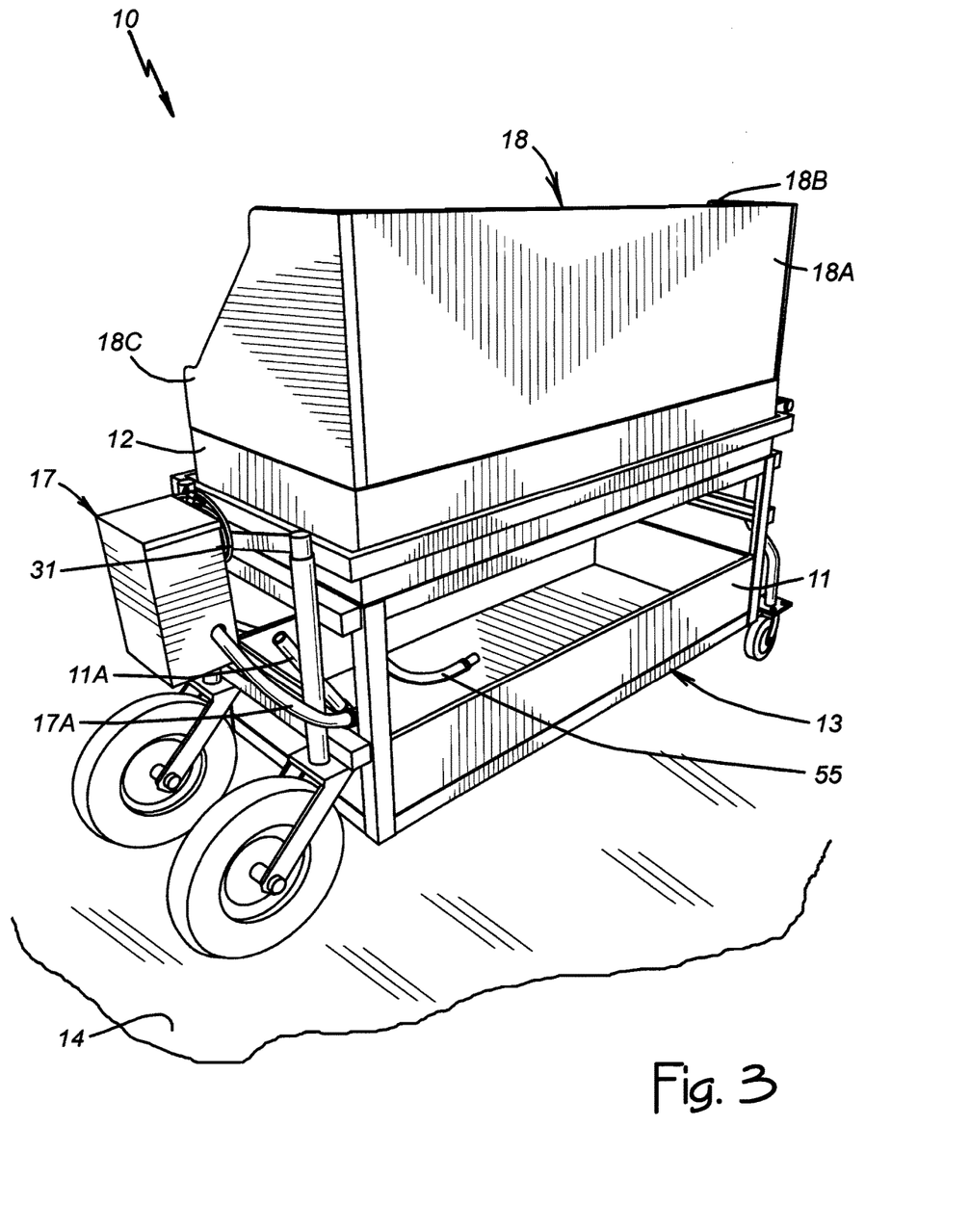
FIG. 3 is a backside perspective view of the apparatus showing the top, back, and right side of the apparatus.

Further details of the apparatus 10 are shown in FIGS. 2 and 3. Preferably, the apparatus 10 includes a second hose-and-nozzle combination 16B (FIG. 2) that enables contemporaneous use of the apparatus 10 by two drywallers standing side by side (not shown). Rinse water (not shown in FIGS. 2 and 3 for illustrative purposes) is delivered under pressure through both of the hose-and-nozzle combinations 16A and 16B by a water-pumping assembly 17 that is identified in FIG. 3. An upstanding spray-confining component 18 of the apparatus 10 (FIGS. 2 and 3) extends above the upper tank 12 to help confine rinse water sprayed toward the tools that might not otherwise be collected by the upper tank 12. The spray-confining component 18 (also called a splash guard component) preferably includes a back panel 18A, a left side panel 18B, and a right side panel 18C that cooperatively enhance spray confinement. The apparatus 10 also includes a shelf 19 that extends between the left and right side panels 18B and 18C for use in holding tools before and after they have been rinsed. A plate 20 disposed over the upper tank 12 (FIG. 2) provides an additional tool-holding work surface for use in holding drywall tools before and after rinsing. After rinsing, rinse water can flow off the tools through apertures in the shelf 19 and the plate 20 for collection in the upper tank 12.

Figure 4:
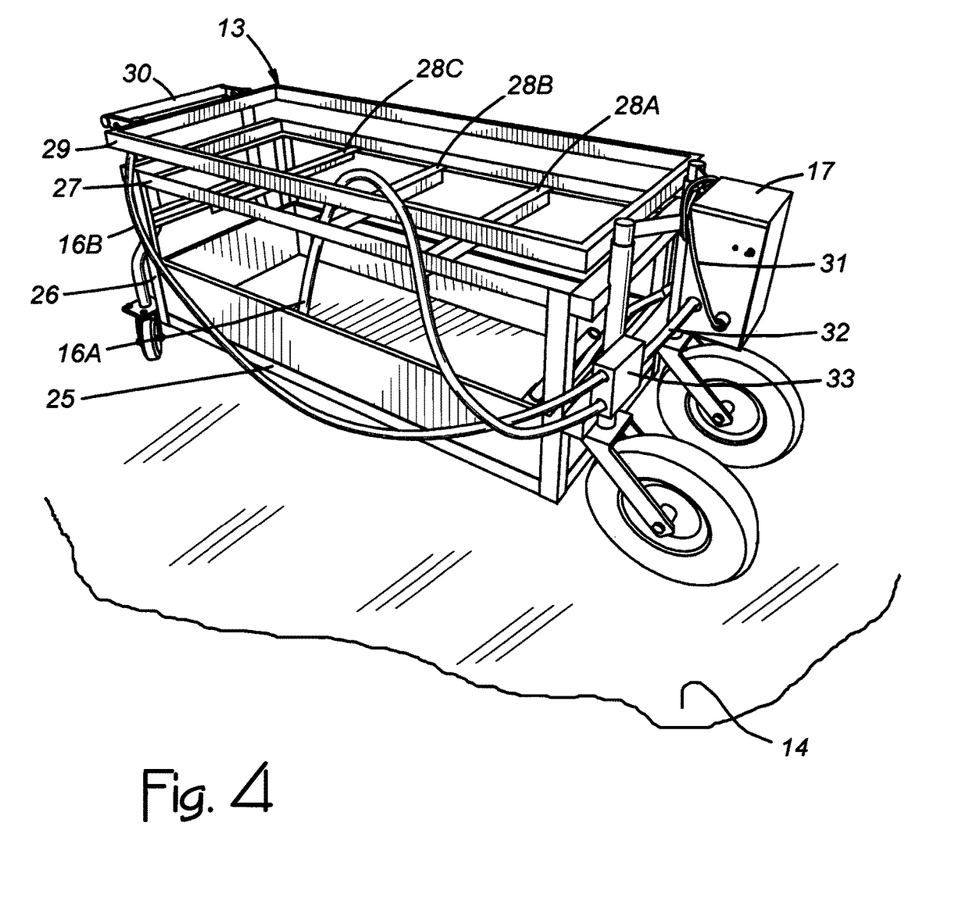
FIG. 4 is a perspective view showing the top, front, and right side of the support structure portion of the apparatus together with the lower tank.

FIG. 4 is a perspective view of the support structure 13 with the upper tank 13 and spray-confining component 18 omitted for illustrative purposes. The support structure 13 takes the form of a framework constructed of pieces of angle iron that are composed of a suitably strong, rigid material (e.g., metal, plastic, and/or carbon composite material). Those pieces are bonded, welded, or otherwise interconnected in the configuration illustrated to provide a portable cart for holding the lower and upper tanks 11 and 12, one tank above the other.

The illustrated framework includes an angle iron lower rail 25 that provides a horizontally and inwardly extending flange (i.e., one leg of the two perpendicular legs of the angle iron) for supporting the lower tank 11. The framework also includes four upstanding angle iron members 26 that support the corners of an angle iron upper rail 27 (just one angle iron member 26 is identified in FIG. 4). The angle iron upper rail 27 provides a horizontally and inwardly extending flange for supporting the upper tank 12, while a complement of three cross members 28A, 28B, and 28C extend laterally across the upper rail 27 to provide additional support of the upper tank 12.

Although not visible in FIG. 4, a complement of three cross members extend laterally across the angle iron lower rail 25 to help support the upper tank 12. Additionally, the support structure 13 includes a tank-stabilizing rail 29 that circumscribes the upper tank 12 when the upper tank 12 is in place. A handle 30 connected to the framework provides a component to grasp and push or pull in order to move the support structure 13 over the horizontal support surface 14 to a desired location, with the support structure 13 including a complement of wheels that facilitate such movement.

FIG. 4 also provides another view of the water-pumping assembly 17, along with a power cord 31 that couples electric power to the water-pumping assembly 17 from a suitable source (e.g., a 120-volt electrical outlet). In operation, water flows under pressure through an outlet hose 32 to a manifold 33 that serves to split and couple the flow of rinse water to the two hose-and-nozzle combinations 16A and 16B.

Figure 5:
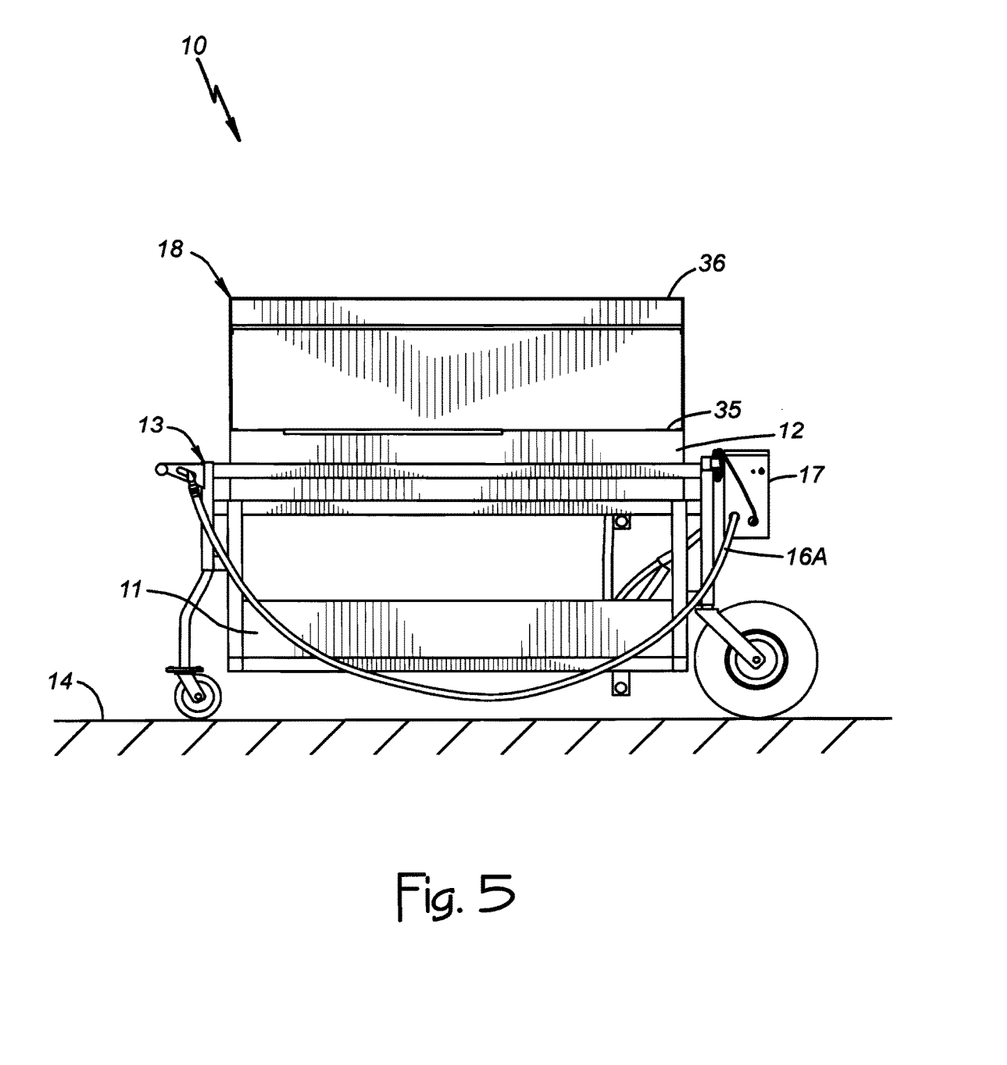
FIG. 5 is a front elevation view of the apparatus for one-hose use, without the two-hose manifold and a second hose-and-nozzle combination.

FIG. 5 is a front elevation view of the apparatus 10 that provides an idea of its convenient, two-person, workbench size. With the apparatus 10 in the operative position on the horizontal support surface 14 (mentioned earlier with reference to FIG. 1), an upper lip 35 of the upper tank 12 is about 35 inches high (i.e., about 35 inches above the horizontal support surface 14). In that position, the 20-inch high spray-confining component 18 extends upwardly from the upper lip 35 to an upper edge 36 that is about 55 inches high (i.e., about 55 inches above the horizontal support surface 14). Those sizes enable use of the apparatus 10 in a standing position by a person whose height is not significantly greater or less than the average height of a male person (i.e., 5 feet 10 inches); a person of average height can clean tools conveniently while standing next to the apparatus 10.

As a further idea of size, the apparatus 10 is about 60 inches long as measured along the upper edge 36 of the spray-confining component 18. Other parts of the apparatus 10 shown in FIG. 5 are drawn to the same drawing scale so that their sizes can be ascertained from the dimensions recited herein. Dimensions may vary (e.g., by as much as twenty percent or so) from the values recited without departing from the dimension-related aspects of the present invention. Notice that FIG. 5 shows the apparatus 10 with just the one hose-and-nozzle combination 16A connected to the water-pumping assembly 17; that option is available for one-person use. Preferably, the water-pumping assembly 17 is mounted removably on the support structure 13 (e.g., hung by a telescoping, concentric-tubes mounting arrangement visible in FIG. 4) in order to thereby enable convenient removal of the water-pumping assembly 17 by the user when the apparatus 10 is unattended (e.g., to avoid theft or vandalism thereof).

Figure 6:
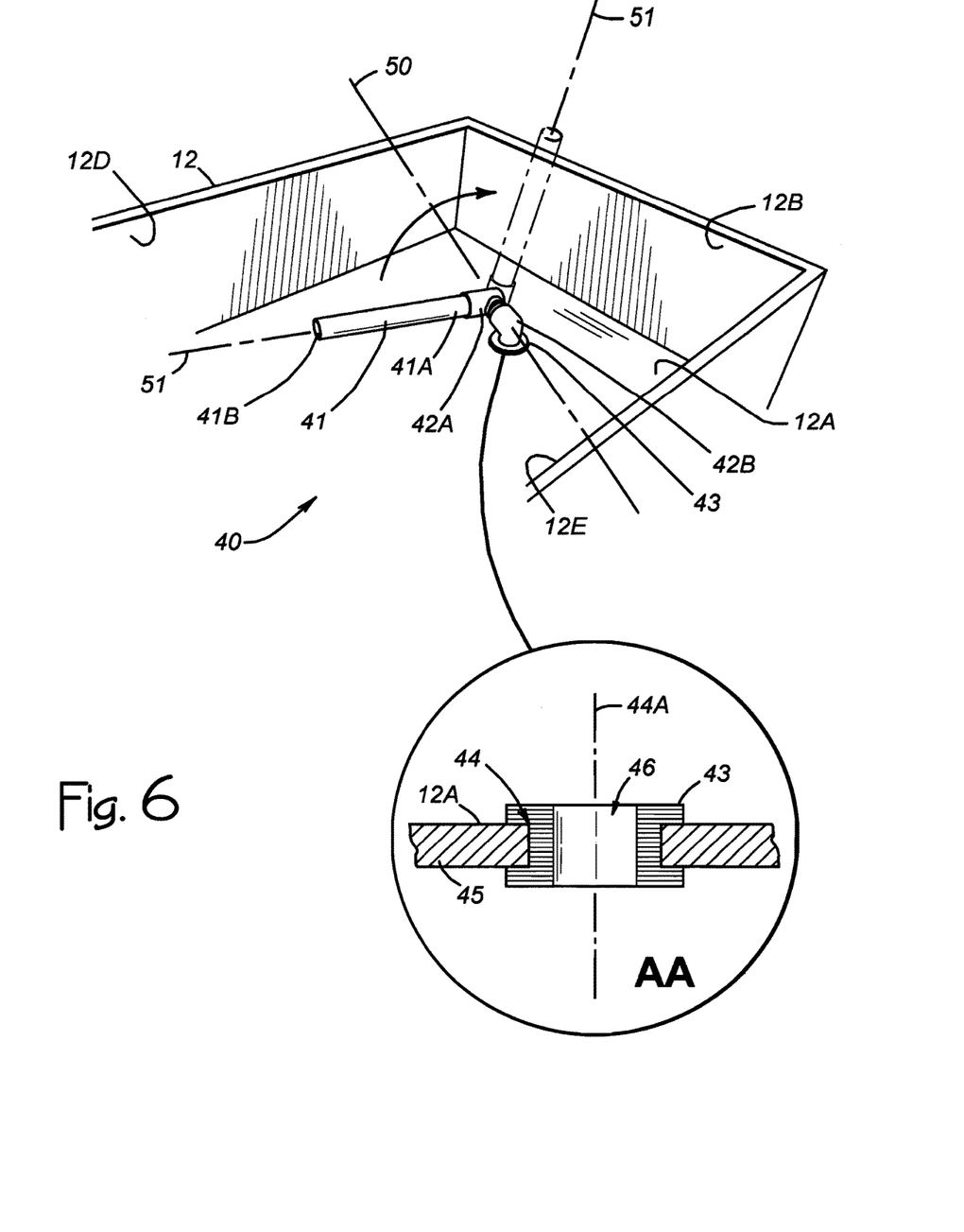
FIG. 6 is a perspective view of a portion of the upper tank showing the tube of the upper water-draining assembly in a water-draining position (solid lines) and in a non-draining position (in phantom lines)

Next, consider FIG. 6, it shows details of an upper water-draining assembly 40 on the upper tank 12, with the upper tank 12 shown oriented as it would be when the apparatus 10 is in the operative position mentioned previously. First, consider details of the upper tank 12. It is a rectangularly shaped container that is upwardly opening when so oriented. It is constructed, for example, from interconnected sheets of material (e.g., 0.1875-inch thick sheets of metal, plastic, or carbon composite) so that it includes a rectangular, flat, planar, upwardly facing bottom surface 12A of a bottom portion of the upper tank 12 (i.e., a surface that is parallel to the XZ-plane of the XYZ Cartesian coordinate system shown in FIG. 1). The upper tank 12 also includes four upstanding sides 12B, 12C, 12D, and 12E that extend perpendicularly upward from the bottom surface 12A, including two oppositely disposed, laterally extending ends 12B and 12C, and two oppositely disposed, longitudinally extending sides 12D and 12E. The end 12B is visible in FIG. 6, while both of the ends 12B and 12C are identified in FIG. 8.

The upwardly facing bottom surface 12A is about 58 inches long measured along the longitudinally extending sides 12D and 12E, and about 25.5 inches wide measured along the laterally extend end 12B. The four upstanding sides extend upwardly from the bottom surface 12A about 9.5 inches high. Thus, the upper tank 12 can easily hold 50 gallons of used rinse water. Of course, the foregoing dimensions of the upper tank 12 may vary without departing from the broader inventive aspects of the present invention. Whatever dimensions are used for the upper tank 12, the support structure 13 is configured accordingly to accommodate the size of the upper tank 12. The lower tank 11 is similar to the upper tank 12 in size, layout, and details of construction. So, the lower tank 11 is not described in full detail here, other than to note that it is provided with a lower water-draining assembly similar to the water-draining assembly 40 of the upper tank 12.

Considering the water-draining assembly 40 of the upper tank 12 in further detail with reference to FIG. 6, it includes a hollow tube 41 (e.g., a 12-inch long section of one-inch diameter PVC pipe) having a first end portion 41A that is coupled by a first 90-degree elbow 42A and a second 90-degree elbow 42B to a drain component 43 (e.g., PVC plumbing components). As illustrated in the encircled diagrammatic detail AA provided in FIG. 6, the drain component 43 extends through a hole 44 in a bottom portion of the upper tank 12 (i.e., a bottom 45 in the detail AA) along a central axis 44A.

The detail AA includes portions in cross section as viewed in a bisecting plane perpendicular to the upwardly facing bottom surface 12A, with the second 90-degree elbow 42B omitted for illustrative purposes. The detail AA is only diagrammatic in order to identify the hole 44 and its features, but the drain component 43 can, for example, take the form of a known type of one-inch diameter, exteriorly threaded, tank-to-fitting type of PVC connector that is commonly referred to as a "through-wall" fitting. Such a fitting is also commonly referred to as a "bulkhead" fitting, and it may include, for example, a top piece (not illustrated) on the bottom surface 12A of the tank 12 and a gasket-and-nut combination (not illustrated) on the downwardly facing underside of the bottom 45. Other plumbing designs may be used for drain component 43, with the drain component 43 functioning as a connection to the second 90-degree elbow 42B that provides a drainage path 46 (through which a user can selectively drain clarified water from the upper tank 12 to beneath the upper tank 12) while connecting to, supporting, and allowing pivotal movement of the second 90-degree elbow 42B.

When the apparatus 10 is in the operative position mentioned previously, a central drain-hole axis 44A of the hole 44 extends vertically (i.e., perpendicular to the bottom surface 12A and parallel to the Y-axis of the XYZ Cartesian coordinate system shown in FIG. 1). The first end portion 41A of the tube 41 is coupled physically by the first 90-degree elbow 42A and the second 90-degree elbow 42B for pivotal movement about a pivotal axis 50 that extends parallel to the bottom surface 12A of the upper tank 12 and perpendicular to the drain-hole axis 44A. The user pivots the tube 41 manually. A curved arrow head in FIG. 6 depicts such pivotal movement from a first or water-draining position of the tube 41 (illustrated with solid lines) to a second or non-draining position (illustrated with phantom lines). In the water-draining position of the tube 41 (i.e., of to water-draining assembly 40), a central axis of elongation 51 of the tube 41 is parallel to the bottom surface 12A of the upper tank 12 so that clarified rinse water can enter a second end portion of the tube 41 (i.e., an inlet 41B of the water-draining assembly 40). In the non-draining position (shown in phantom lines), the central axis of elongation 51 extends upwardly away from the upper surface 12A so that clarified rinse water cannot enter the input 41B.

As a result of that arrangement, the user can grasp the tube 41 and move it downwardly (pivot it) from the non-draining position toward (or fully to) the water-draining position in order to immerse the input 41B in clarified rinse water, when and to the extent desired, in order to thereby drain the clarified rinse water from the upper tank 12 when desired (i.e., through the tube 41 and the two 90-degree elbows 42A and 42B to and out of the drain component 43). Preferably, pivotal motion of the tube 41 is slightly restricted (e.g., by a somewhat tight friction fit) so that the tube 41 remains in a position to which the user has pivoted it, without the user being required hold it in that position as draining occurs. The user pivots the tube 41 back to the non-draining position when desired in order to terminate drainage.

Figure 7:
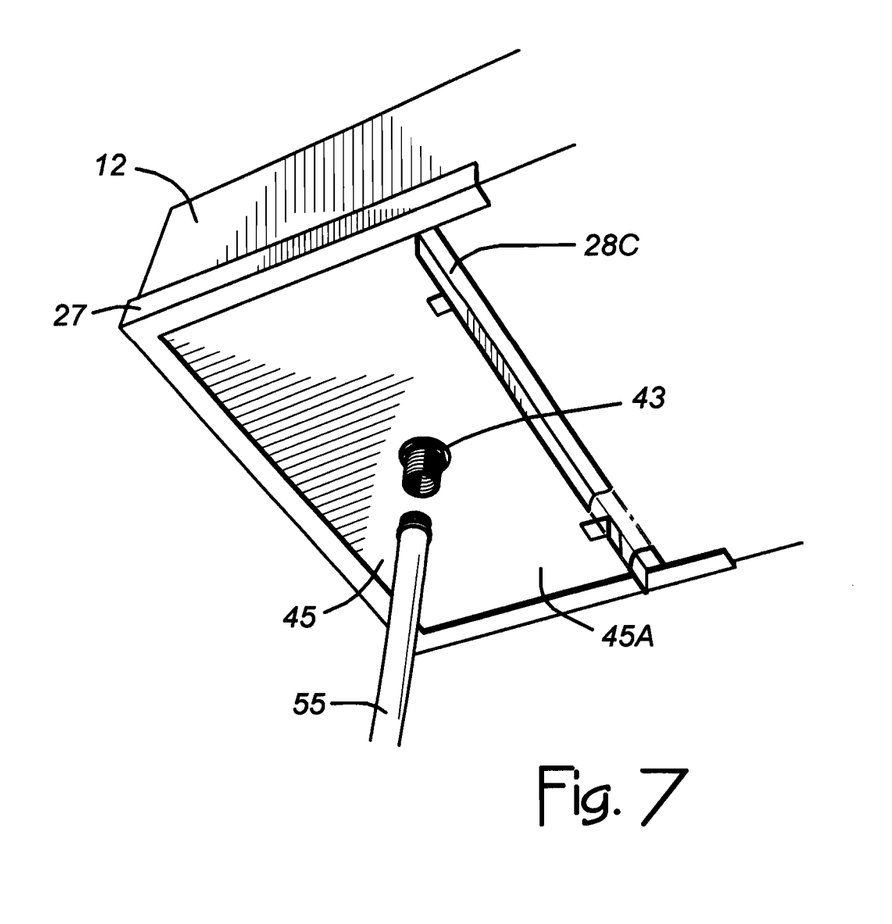
FIG. 7 is a perspective view of the underside of the lower tank showing additional details.

FIG. 7 shows the drain component 43 extending downwardly beyond the downwardly facing underside 45A of the bottom 45 of the upper tank 12. Clarified rinse water that enters the input 41B of the tube 41, as described above, flows downwardly and out the drain component 43, and into the lower tank 11. Preferably, a drain hose 55 (e.g., ¾-inch diameter flexible hose) is provided that the user connects to the drain component 43 in order to guide the flow of clarified rinse water back to the lower tank 11 with reduced splashing. FIG. 7 also shows the cross members 28C helping to support the upper tank 12.

The diagrammatic views of FIGS. 8, 9, 10, and 11 help summarize use of the apparatus 10 according to the methodology of the present invention. First, remember that the lower tank 11 is similar in construction to the upper tank 12. As such, it includes a pivotable water-draining assembly 11A connected to a drain component 11B on a bottom 11C of the lower tank 11. The water-draining assembly 11A is similar to the water-draining assembly 40 of the upper tank 12; by adjusting the position of the water-drawing assembly 11A, the user 15 can selectively drain rinse water from the lower tank 11.

Figure 8:
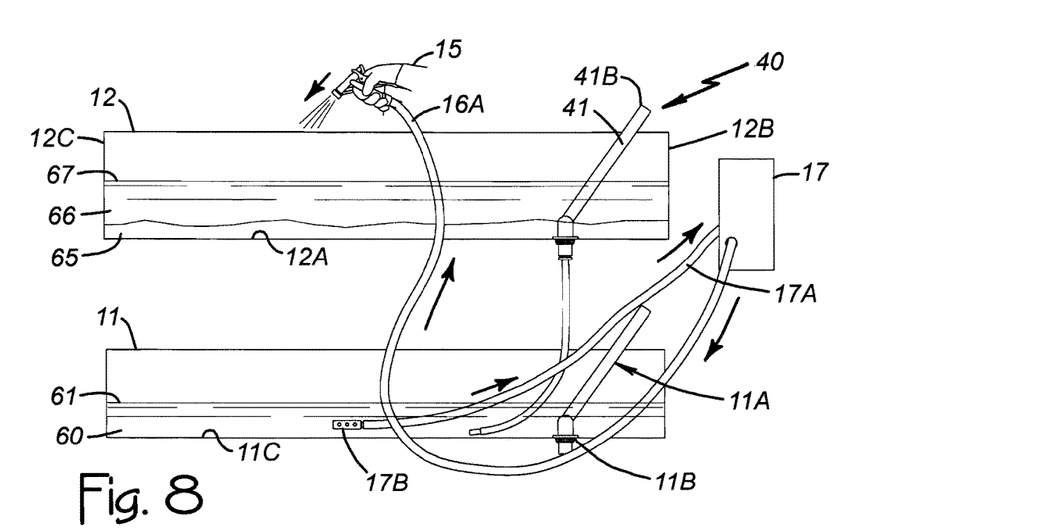
FIG. 8 is a diagrammatic view showing the flow of the rinse water from the lower tank for tool-rinsing purposes, with the tube of the upper water-draining assembly in a raised, non-draining position.

The lower tank 11 is illustrated in FIG. 8 holding a body 60 of rinse water that has fallen during tool rinsing to a rinse water level 61, with the water-draining assembly 11A in a non-draining position. As illustrated in FIG. 8, rinse water from that body 60 of rinse water has been pumped from the lower tank 11 though an inlet hose 17A (e.g., a ¾-inch diameter flexible hose) by operation of the water-pumping assembly 17, with a screen filter 17B preferably provided on the inlet hose 17A for rinse-water filtering purposes (i.e., a type of filter that uses a rigid or flexible screen to separate particles out of water in any of various applications; typical screen materials include stainless steel mesh, polypropylene, nylon, and polyester) Rinse water is delivered that way under pressure for tool-rinsing purposes by the water-pumping assembly 17, through the first hose-and-nozzle combination 16A, so that the user 15 can rinse tools above the upper tank 12. Bold arrowheads along the hoses in FIG. 8 identify the rinse water flow path.

As tool-rinsing proceeds, the upper tank 12 collects the used rinse water, with mud settling out of the used rinse water under action of the water-clarifying agent in the used rinse water. As illustrated in FIG. 8, the mud has settled to the upwardly facing bottom surface 12A of the upper tank 12 as a body 65 of settled mud, leaving a body 66 of clarified rinse water above it; the clarified rinse water is illustrated in FIG. 8 at a level 67 to which it has risen during tool rinsing. A larger body 66A, higher level 67A, larger body 65A, and smaller body 60A in FIG. 9 simply depict changes in size and height of those items as tool rinsing proceeds.

Figure 9:
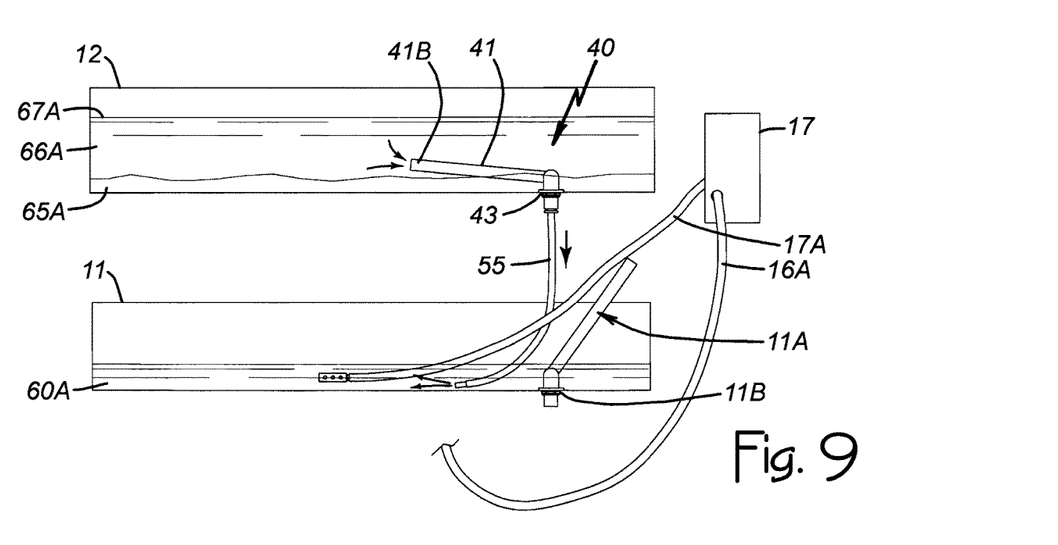
FIG. 9 is a diagrammatic view showing the flow of the clarified rinse water after the tube of the upper water-draining assembly has been lowered so that the inlet is immersed in the clarified rinse water.

After the user 15 stops tool rinsing and waits for the mud to settle, the user 15 proceeds to drain the clarified rinse water from the upper tank 12. The user 15 does so by pivoting the tube 41 of the water-draining assembly 40 to a water-draining position as shown in FIG. 9, so that the input 41B of the tube 41 is sufficiently submersed in the body 66A of clarified rinse water to enable drainage through the drain component 43 and the drain hose 55 back to the lower tank 11. Bold arrowheads in FIG. 9 at the input 41B and along the drain hose 55 identify the clarified rinse water flow path.

Figure 10:
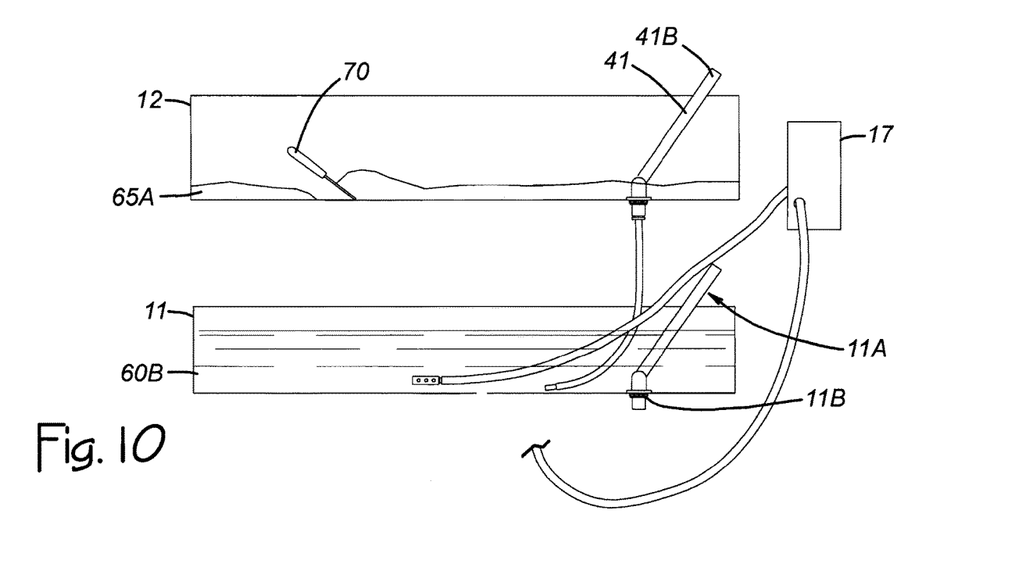
FIG. 10 is a diagrammatic view showing scraping of the settled mud from the upwardly facing bottom surface of the upper tank.
Figure 11:
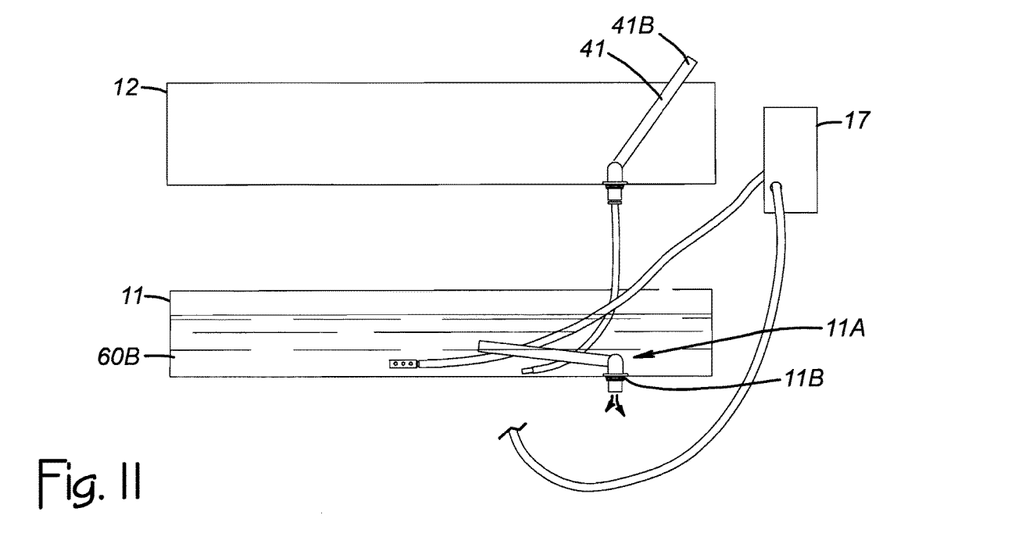
FIG. 11 is a diagrammatic view showing draining of the lower tank with the lower water-draining assembly for removal of the rinse water.

Having drained the body 66A of clarified rinse water from the upper tank 12 down to the level of the settled mud, the user 15 proceeds to scrape the body 65A of settled mud from upwardly facing bottom surface 12A of the upper tank. Before doing so, the user 15 may add a water-adsorbing agent to the upper tank 12 in order to facilitate mud removal. A quantity of kitty litter may be used for that purpose. Thereafter, the user 15 uses a trowel or other suitable tool 70 to scrape the body 65A of settled mud from the bottom surface 12A for removal, as depicted in FIG. 10. The user 15 may then, or at the end of the work day, drain any rinse water remaining in the lower tank 11 (e.g., the body 65B of rinse water shown in FIGS. 10 and 11) by operating the water-draining assembly 11A. The user 15 pivots the water-draining assembly 11A from a non-draining position shown in FIG. 10 to a water-draining position shown in FIG. 11, as was done for the water-draining assembly 40 on the upper tank 12). Bold arrowheads below the drain component 11B in FIG. 11 identify such rinse water drainage.

To summarize the methodology of the present invention, a method for cleaning (i.e., rinsing) drywall tools includes the step of providing an apparatus as discussed above. The apparatus includes:

(i) a lower tank for holding a supply of rinse water that includes a water-clarifying agent,
(ii) an upper tank for collecting used rinse water as a user rinses hot mud from the drywall tools over the upper tank, said used rinse water including hot mud suspended in rinse water,
(iii) a tank-supporting structure for holding the lower and upper tanks on a horizontal support surface so that the upper tank is disposed in an upper tank position that is higher than the lower tank,
(iv) a water-pumping assembly for pumping the rinse water from the lower tank for delivery under pressure above the upper tank for tool-rinsing purposes, and
(v) an upper water-draining assembly for draining clarified rinse water from the first tank back to the second tank after hot mud has settled from the used rinse water under action of the water-clarifying agent, said upper water-draining assembly including an inlet with an adjustable height above an upwardly facing bottom surface of the upper tank.

The method proceeds by rinsing hot mud from the drywall tools over the upper tank with the rinse water, while the inlet of the upper water-draining assembly is above a level of the used rinse water collected in the upper tank so that the used rinse water does not drain back to the lower tank. Then, after rinsing the drywall tools and after the hot mud has settle to an upwardly facing bottom surface of the upper tank to result in a body of clarified rinse water disposed above settled hot mud, the user lowers the inlet of the upper water-draining assembly, so that at least a portion of the clarified rinse water in the upper tank drains back into the lower tank. Thereafter, the user cleans settled mud from the upwardly facing bottom surface of the first tank. The foregoing avoids draining hot mud from the upper tank to the lower tank and the potential of associated hot-mud damage to equipment.

The apparatus 10 with its effective mud-avoiding water-draining assembly 40 can also be used to clean other tools within the inventive concepts disclosed. To use the apparatus 10 for rinsing concrete, cement, plaster, and the like (i.e., "cement-like material") from tools, for example, the user first sprays the interior surfaces of the upper tank 12 with a coat of masking material that prevents that type of cement-like material from adhering to the inside of the upper tank 12. A known type of non-adhering, barrier spray may be used for that purpose, for example. As the user rinses the cement-like material from tools, the used rinse water is collected in the upper tank 12, whereupon the cement-like material settles out of the used rinse water, leaving a body of "cement-free water" above it. The user then drains the cement-free water using the water-draining assembly 40 of the apparatus 10. After that, the settled cement-like material is scrapped or peel away from the tank 12 and removed.

Reviewing some of the nomenclature used in this description, the term "tank" herein includes an upwardly opening container for holding at least 50 gallons of rinse water (e.g., the lower tank 11) or a similar tank for collecting the used rinse water during tool rinsing (e.g., the upper tank 12), although that size may vary as much as about twenty percent or so within the size-related aspects of the present invention. Preferably, the upper tank 12 is elongated and rectangularly shaped as illustrated and described, with a generally planar upwardly facing bottom surface 12A that facilitates the task of scraping settled mud from that bottom surface. The illustrated upper tank 12 has a rectangular shape with inside dimensions of approximately 58 inches long, about 25 inches to about 26 inches wide, and about 9 inches to about 10 inches deep. A 50-gallon, flat-bottom upper tank results in a thin layer of hardened hot mud on the upwardly facing bottom surface of the upper tank that is easier to scrape for removal from the tank.

The term "water-clarifying agent" as used herein, includes known types of chemical compounds used to gather (e.g., coagulate or agglomerate) and/or to precipitate suspended particles (e.g., constituents of mud) so they may be removed from the water in which they are suspended. Those terms include the substances called coagulants and flocculents. They also include inorganic salts or aluminum (alum) and other metals or water-soluble organic polyelectrolytes. A suitable clarifying agent (i.e., mud-settling additive) is commercially available under the trademark WASHMASTER from Mudmaster, Inc. of Escondido, Calif. It is available in a twelve-ounce bottle, that amount being sufficient to treat fifteen gallons of water. Preferably, the "rinse water" referred to herein includes such a clarifying agent, and, preferably, an anti-foaming agent also (e.g., a known type of anti-foaming agent). The term "used rinse water" herein means rinse water collected in the upper tank 12 after it has been used to rinse tools (i.e., rinse water with mud suspended in it), while "clarified rinse water" means used rinse water in the upper tank 12 after the mud has settled.

The term "kitty litter" is used herein to denote any type of cat litter. It was a brand name that has become genericized. Kitty litter is a loose, granular material that absorbs moisture and odors. Most clumping kitty litter is made from granulated bentonite clay which clumps together when wet and forms a solid mass separate from the other litter in the box. Those attributes can facilitate mud removal from the upper tank of an apparatus constructed according to the present invention.

A "hose-and-nozzle combination" means a flexible hose (e.g., ⅝-inch diameter garden-type hose) with a nozzle on one end. A "screen filter" is a type of filter using a rigid or flexible screen to separate particles out of water in any of various applications. Typical screen materials include stainless steel mesh, polypropylene, nylon, and polyester. The term "angle iron" herein refers to an elongated structural piece having an L-shaped cross section (i.e., two legs that are perpendicular to each other), regardless of the material of which it is composed (i.e., it is not necessarily composed of iron or steel). Concerning the tube 41, it is a rigid hollow member (e.g., a length of PVC plumbing pipe) having a hollow interior extending between the first end portion 41A of the tube 41 that is connected in fluid communications with the drain component 43 and a second end portion that provides the inlet 42B to the water-draining assembly 40 that is in fluid communications with the hollow interior of the tube 41. As for the term "workbench-like size" herein, it means an apparatus having sufficient size to enable convenient contemporaneous use by at least two male users of average height who are working side-by-side in standing positions as they rinse tools.

Thus, the invention provides a two-person, portable, workbench size, apparatus for use in cleaning hot mud from drywall tools while avoiding hot-mud damage to equipment. Although an exemplary embodiment has been shown and described, a person having ordinary skill in the art may make many changes, modifications, and substitutions without necessarily departing from the spirit and scope of the invention. As for the specific terminology used to describe the exemplary embodiment, it is not intended to limit the invention; each specific term is intended to include all technical equivalents that operate in a similar manner to accomplish a similar purpose or function.

What is claimed is:

1. An apparatus for use in cleaning drywall tools, the apparatus comprising:
    a lower tank for holding a body of rinse water, an upper tank for collecting used rinse water, and a tank-supporting structure for supporting the lower and upper tanks above a horizontal support surface so that the upper tank is higher than the lower tank;
    a water-pumping assembly for pumping rinse water from the lower tank for purposes of rinsing tools over the upper tank; and
    an upper water-draining assembly on the upper tank for draining clarified rinse water from the upper tank back to the lower tank;
    wherein the upper tank includes a bottom of the upper tank, and a drain component extending through the bottom of the upper tank for water-draining purposes;
    wherein the water-draining assembly includes a tube having a first end portion in fluid communication with the drain component and a second end portion that defines an inlet to the water-draining assembly;
    wherein the tube is mounted on the upper tank movably so that a user can manually adjust the inlet between a water-draining position of the tube and a non-draining position of the tube;
    wherein the water-draining position of the tube is such that the inlet is lower than an upper lip of the upper tank when the tube is in the water-draining position of the tube, so that a user can immerse the inlet in the clarified water for purposes of draining the clarified water from the upper tank back to the lower tank; and
    wherein the non-draining position of the tube is such that the inlet is disposed above the upper lip of the upper tank when the tube is in the non-draining position of the tube;
    thereby to enable a user to drain the clarified rinse water from the upper tank back to the lower tank when desired without draining mud rinsed from the tools.

2. An apparatus as recited in claim 1, wherein the upper tank includes an upwardly facing bottom surface that is generally planar in order to facilitate removal of mud from the upper tank that has settled from the used rinse water to the upwardly facing bottom surface.

3. An apparatus as recited in claim 2, wherein the upper tank has a rectangular shape with inside dimensions of approximately 58 inches long, about 25 inches to about 26 inches wide, and about 9 inches to about 10 inches deep.

4. An apparatus as recited in claim 1, wherein the water-pumping assembly includes a manifold for coupling a flow of rinse water to two hose-and-nozzle combinations in order to enable contemporaneous use of the apparatus by two persons standing side by side.

5. An apparatus as recited in claim 1, wherein the water-pumping assembly is mounted on the tank-supporting structure removably to enable removal when the apparatus is unattended.

6. An apparatus as recited in claim 1, wherein the tank-supporting structure includes wheels that enhance portability of the apparatus.

7. An apparatus as recited in claim 1, wherein the tank-supporting structure includes a framework composed of multiple pieces of angle iron that are interconnected to removably support the first and second tanks.

8. An apparatus as recited in claim 1, further comprising a tool-holding work surface disposed over at least a portion of an upwardly opening top portion of the upper tank.

9. An apparatus as recited in claim 1, further comprising a spray-confining component disposed upwardly along a rearward side of the upper tank.

10. An apparatus for use in cleaning drywall tools, the apparatus comprising:
- a lower tank for holding a supply of at least 50-gallons of rinse water that includes a water-clarifying agent;
- an upper tank for collecting at least 50-gallons of used rinse water that results from a user rinsing tools with the rinse water from the lower tank over the upper tank, said used rinse water including rinse water from the lower tank and mud suspended in the used rinse water;
- a tank-supporting structure for holding the lower and upper tanks on a horizontal support surface so that the upper tank is disposed in an upper tank position that is higher than the lower tank;
- a water-pumping assembly for pumping the rinse water from the lower tank for purposes of rinsing tools over the upper tank; and
- an upper water-draining assembly on the upper tank for draining clarified rinse water from a body of clarified rinse water in the upper tank that is disposed above settled mud that has settled from the used rinse water to an upwardly facing bottom surface of the upper tank under action of the water-clarifying agent;
- wherein the upper water-draining assembly includes an inlet with an adjustable height above the upwardly facing bottom surface of the upper tank;
- wherein the water-draining assembly includes a tube having a first end portion in fluid communication with the drain component and a second end portion that defines the inlet of the water-draining assembly;
- wherein the tube is mounted on the upper tank movably so that a user can manually adjust the inlet between a water-draining position of the tube and a non-draining position of the tube;
- wherein the water-draining position of the tube is such that the inlet is lower than an upper lip of the upper tank when the tube is in the water-draining position of the tube, so that a user can immerse the inlet in the clarified water for purposes of draining the clarified water from the upper tank back to the lower tank; and
- wherein the non-draining position of the tube is such that the inlet is disposed above the upper lip of the upper tank when the tube is in the non-draining position of the tube;
- thereby to enable a user to adjust the inlet to a height above the upwardly facing bottom surface of the upper tank at which the used rinse water is not drained from the upper tank, and to lower the inlet into the clarified rinse water in order to drain the clarified rinse water back to the lower tank without draining the mud rinsed from the tools.

* * * * *